W. V. TURNER.
FLUID PRESSURE BRAKE.
APPLICATION FILED NOV. 28, 1908.
1,096,870.
Patented May 19, 1914.
2 SHEETS—SHEET 2.
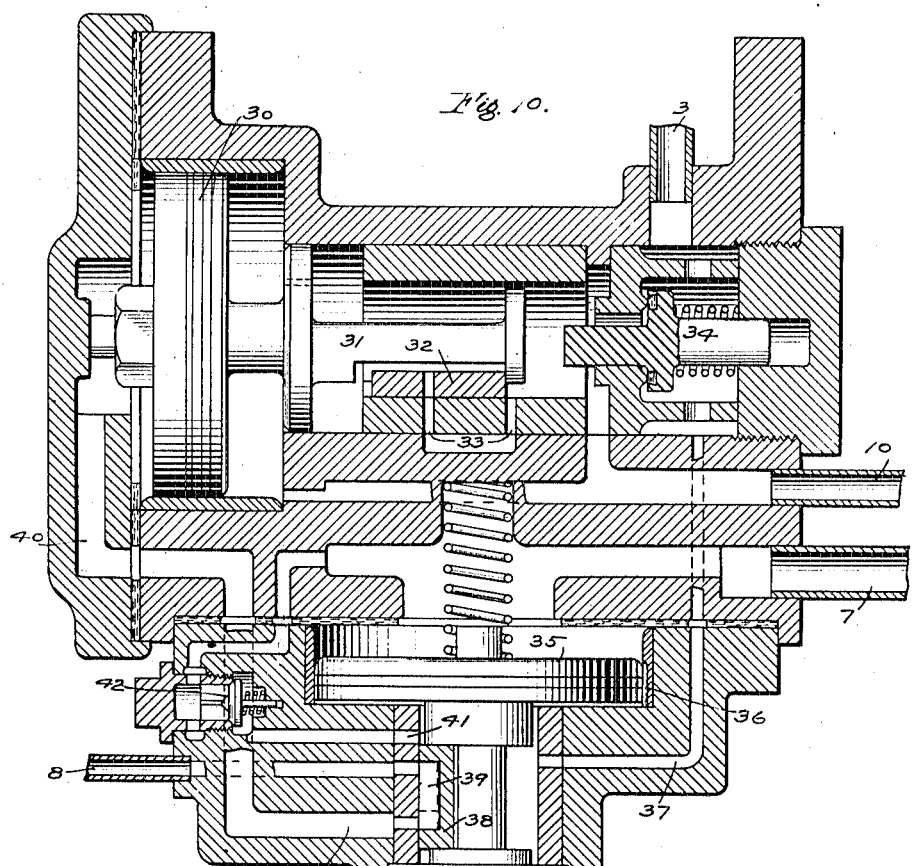
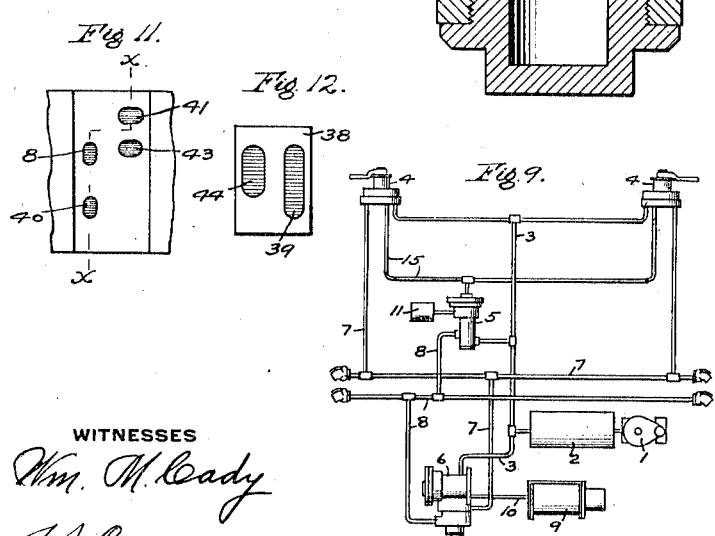
WITNESSES
Wm. M. Cady
J. S. Custer
INVENTOR
Walter V. Turner
by E. Wright
Att'y.

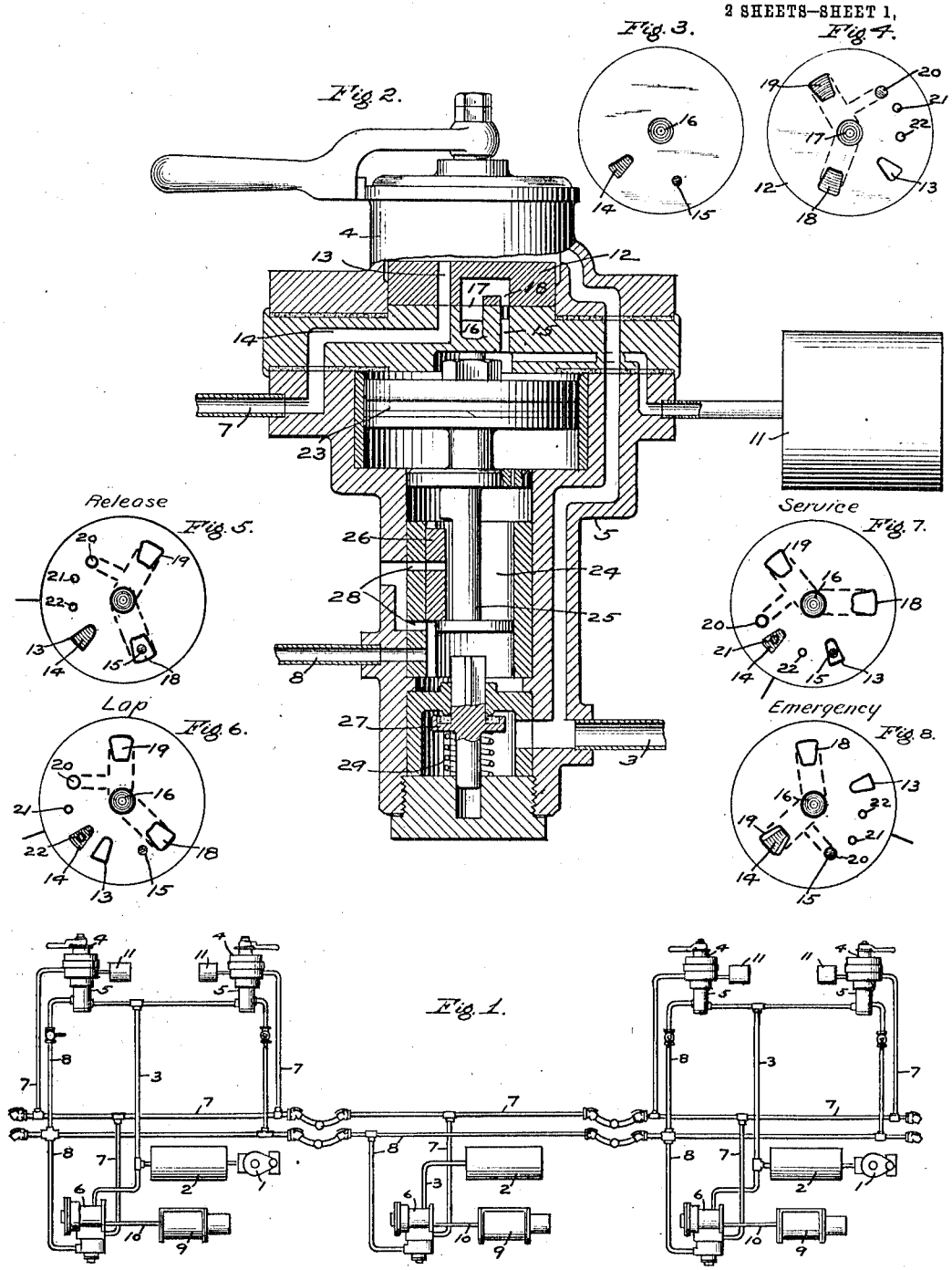

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,096,870.    Specification of Letters Patent.    Patented May 19, 1914.

Application filed November 28, 1908. Serial No. 464,974.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes for railway cars and is in the nature of an improvement in the particular air brake system covered by my prior pending application Serial No. 370,193, filed April 25, 1907, in which each car or vehicle brake equipment comprises a reservoir of large capacity supplied with compressed air in any desired manner, an application and release valve mechanism operated by the variation of fluid pressure in the independent train pipe line for controlling the supply of air under pressure to and its release from the brake cylinder, and an emergency valve device adapted to operate under a reduction in pressure in the automatic or emergency train pipe line to supply air under pressure to the application valve mechanism, and to cut off communication to the independent train pipe line, the independent train pipe being normally at atmospheric pressure when the brakes are released, and a motorman's brake valve being employed to supply air under pressure to and release the same from said independent train pipe to effect the application and release of the brakes. With this prior construction applied to a train of several cars, the independent train pipe line extending therethrough and being connected by flexible hose and couplings between said cars, there is liability of leakage occurring in the independent train pipe, and inasmuch as the brake cylinder pressure corresponds with the independent train pipe pressure, it is important that the same should not be reduced by leakage during an application of the brakes.

One of the objects of my present invention therefore is to provide a maintenance valve device for the independent train pipe which shall operate to automatically maintain the pressure in said pipe at the desired degree to which such pressure is set in making the application, regardless of the leakage that may occur therein. This valve device may also be designed to control the supply of air under pressure to the independent train pipe, in making a brake application, in such a manner that the rate of increase in such pressure, and consequently the speed of application of the brakes shall be substantially constant with different lengths of train, and this comprises another important feature of my invention. By means of this feature of my improvement, this form of brake equipment may be successfully employed on trains of various lengths from one to a large number of cars, and the rate of application of the brakes will be substantially uniform in all cases and may be about equivalent to the control upon a single car. This feature also applies to the release of the brakes since the valve mechanism may also be designed to give a substantially uniform rate of release regardless of the number of cars in the train.

Another feature of my invention relates to the emergency valve device and comprises means operated thereby under a reduction in automatic train pipe pressure, for opening a local vent from the automatic train pipe to the atmosphere, brake cylinder, or elsewhere, in order to accelerate the action of the valves in emergency applications.

In the accompanying drawings, Figure 1 is a diagrammatic illustration of a brake system embodying my improvements and adapted to be applied to a train of three cars, two motor cars and an intermediate trailer car; Fig. 2 a sectional view of my improved maintaining and control valve device for the independent train pipe, the brake valve being shown associated directly therewith and also in section; Fig. 3 a plan of the rotary valve seat of the brake valve; Fig. 4 a face view of the rotary valve; Figs. 5, 6, 7 and 8 diagrams illustrating the relative positions of the ports in the rotary valve and its seat in the respective positions, "release", "lap", "service", and "emergency", of the brake valve; Fig. 9 a diagrammatic view of a brake system as applied to a single car, or vehicle, and showing a modification in which the maintaining and control valve device is separated from the brake valves but connected thereto by pipes, a single control valve device being employed for both brake valves; Fig. 10 a sectional view of the application and release valve mechanism and the emergency valve device, the section of the emergency valve seat being taken substantially on the line x—x of Fig. 11; Fig.

11 a plan of the emergency slide valve seat; and Fig. 12 a face view of the emergency slide valve.

While my improvements are adapted to be used on railway vehicles in various classes of service I have illustrated the same in Fig. 1 as applied in electric traction service in which the brake equipment of a motor car may comprise a motor-driven air compressor 1, reservoir 2 connected by pipe 3 with the motorman's brake valve 4, the maintaining and control valve device 5 and the application and emergency valve mechanism 6, the automatic train pipe or emergency line 7 connected to the brake valve and the emergency valve, the independent train pipe line 8 connected to the control valve device 5 and the application valve mechanism 6, and the brake cylinder 9 with pipe 10 leading thereto from the application valve. The reservoirs may be supplied with air under pressure in any other suitable or preferred manner and, in the case of trailer cars, may be supplied through the automatic or emergency train pipe line 7. With this type of brake system as described in the prior pending application above referred to, air under pressure is supplied through the motorman's brake valve to the independent train pipe line in making an application of the brakes, the pressure, being raised to the desired degree in the independent train pipe and on the application valve mechanism, operates the same to supply a corresponding pressure to the brake cylinder. In order to maintain this desired degree of pressure in the independent train pipe, and prevent reduction therein due to leakage during the time that the brakes remain applied, I provide means such as a chamber in which this desired degree of pressure is held substantially constant, and a valve device governed by the pressure of said chamber for controlling the supply of air to the independent train pipe so as to compensate for any leakage therein and automatically maintain the pressure constant. As shown in Fig. 2 of the drawing, such a construction may comprise a chamber or reservoir 11 communicating with the space above the piston or movable abutment 23 which operates a supply valve 27 for controlling the supply of air from a source, such as a main reservoir pipe 3, to the independent train pipe 8 which is in free open communication with the chamber 24 below the piston 23. Any suitable or preferred means may be employed for admitting the desired pressure to the chamber or reservoir 11.

According to the preferred construction the maintaining valve device is so connected up with the brake valve as to also serve to control the supply of air to the independent train pipe in making service applications and to govern the rate of such supply to correspond with the rate of increase in pressure in the maintaining chamber 11, and this may be done, as shown in sheet 1 of the drawing, by providing a brake valve 4 having a restricted port 15 communicating with the control or maintaining chamber 11. In this particular instance the brake valve seat is also provided with port 14 communicating with the automatic or emergency pipe line 7, and an exhaust port 16 leading to the atmosphere, while the rotary valve 12 has through ports 13, 21 and 22, and a large cavity having ports 17, 18, 19 and 20 in the face of the valve.

A maintaining and control valve device may be directly connected to each brake valve as illustrated in Figs. 1 and 2 of the drawing, or if desired a single valve device may be employed and connected to the two brake valves of a motor car by pipe connections as illustrated in Fig. 9. In either case the chamber above the rotary valve 12 of the brake valve communicates with the source of supply or main reservoir pipe 3. The maintaining and control valve device may also serve to govern the discharge or release of air from the independent train pipe, and for this purpose I provide an exhaust valve 26 operated by the stem 25 of the piston 23 and controlling the exhaust port 28. The device then operates as follows: With the brake valve in normal release position as illustrated in Fig. 5, air from the source of supply flows through ports 13 and 14 to the emergency train pipe line keeping the same, and reservoirs on trailer cars, normally charged with air under the desired degree of pressure, as described in my prior application above referred to. In this position the port 15 is open to the atmosphere through cavity 17 and exhaust port 16 so that all air under pressure is released from maintaining chamber 11. The independent train pipe 8 is also open to the atmosphere through chamber 24 and exhaust port 28, and the brakes are released. To make a service application the brake valve is turned to service position, illustrated in Fig. 7, in which air is admitted through a restricted port or passage, such as 13—15 to the maintaining chamber above piston 23. The pressure then increases in the maintaining chamber at a predetermined rate, depending upon its volume and the size of the restricted inlet, and acting on piston 23 moves the same to open the application or supply valve 27 a sufficient amount so that the air from the source of supply or main reservoir pipe 3 shall flow to the independent train pipe 8 and increase the pressure therein and in chamber 24 on the opposite side of piston 23 at substantially the same desired rate. In this manner it will be apparent that air will be supplied to the independent train pipe either more or less rapidly according to its volume or length, corresponding to the number of cars, so that the rate of rise in pressure shall be substantially equal to the rate of increase in the maintaining chamber and regardless of the length of train.

When the desired degree of pressure has been admitted to the maintaining chamber, the brake valve is turned to lap position, illustrated in Fig. 6, in which the port 15 is closed. The pressure in the independent train pipe and in chamber 24 on the under side of piston 23 then being substantially equal to that in the maintaining chamber on the upper side of said piston, the spring 29 moves the valve and piston upward a sufficient distance to close valve 27 but does not open the exhaust port 28 which is still covered by the slide valve 26. The pressure thus admitted to the independent train pipe then operates upon the piston 30 of each of the application valve mechanisms 6 throughout the train to apply the brakes as fully described in my prior application above referred to, as follows:—The air from the independent train pipe 8 flows through the cavity 39 of valve 38 of the emergency valve device and port 40 to the cylinder of piston 30, moving same and stem 31 to actuate valve 32 to close exhaust ports 33, and to open supply valve 34, whereupon air from the main reservoir pipe 3, or source of supply, flows to the brake cylinder 9 through pipe 10, and raises the pressure therein and on the opposite side of piston 30 to the desired degree, and the supply valve 34 then closes.

It will be noticed that in both service and lap positions of the brake valve that communication is open from the supply to port 14 and the emergency train pipe 7 whereby the pressure therein is maintained at the desired degree. It will now be apparent that the brakes will be applied in substantially the same time regardless of the number of cars in the train, and if there should be any reduction in pressure in the independent train pipe, due to leakage at hose connections or elsewhere, while the brakes remain applied, the pressure in the maintaining chamber, which remains constant, will immediately actuate the piston 23 and supply valve 27 to compensate for any such leakage and maintain the pressure in the independent train pipe constant. The brakes may then be wholly or partially released by turning the brake valve to release position, Fig. 5, and discharging any desired amount of air from the independent train pipe as will be readily understood, the brake valve being operated to full release and lap positions alternately for grading down the pressure of the independent train pipe and the brake cylinders. It will also be evident that the release of the brakes will be effected at a substantially uniform rate corresponding with the discharge from the maintaining chamber.

An emergency application of the brakes may be made by turning the brake valves to emergency position, Fig. 8, in which a large opening is made from the automatic train pipe 7 and port 14 through ports 19 and 17 of the cavity in the rotary valve and from the maintaining chamber through ports 15 and 20 to the exhaust port 16, thereby venting the emergency train line to the atmosphere and causing the operation of the emergency pistons 35 and valves 38 to close the independent train pipe and supply air to the application piston 30 to apply brakes as before described. In order to accelerate the emergency application of the brakes I have provided means operated by the movement of the emergency piston to open a local vent from the emergency train line to the atmosphere, brake cylinder or elsewhere, and thereby propagate quick action of the valves through the train, and as shown in Fig. 10, this means comprises the additional ports 41 and 43 adapted to be connected by cavity 44 in slide valve 38 when moved to emergency position and thereby vent air from the emergency train pipe 7 through check valve 42 ports 41 and 43 to the atmosphere, brake cylinder or elsewhere, and thus accelerate the reduction in emergency train pipe pressure. When the pressure is vented from the emergency train pipe 7 which communicates with the chamber above the emergency piston 35, the pressure from the reservoir which communicates through passage 37 with the valve chamber on the opposite side of the piston, moves the same up against the gasket, closing feed groove 36 and actuating the valve 38 to cut off communication from the independent train pipe 8 to port 40, to open communication from the reservoir through ports 37 and 40 to the piston 30 of the application valve, and to open communication from the emergency train pipe to the vent port. The check valve 42 prevents back flow of air from the reservoir to the emergency train pipe. It is also obvious that a similar emergency action of the apparatus will be produced by a bursted hose in the emergency train pipe line or by a pulling apart of the cars of the train, and it is further apparent that by reason of my present improvements this type of brake apparatus may be made to operate equally well upon both short and long trains.

Having now described my invention what I claim as new and desire to secure by Letters Patent, is:—

1. In a fluid pressure brake, the combination with a train pipe line into which air under pressure is admitted when applying brakes, and a valve mechanism operated by pressure in said train pipe for controlling the supply of air to a brake cylinder, of means subject to opposing fluid pressures for automatically increasing the train pipe pressure at a predetermined rate and for maintaining the said train pipe pressure constant during the time that brakes are held applied.

2. In a fluid pressure brake, the combination with a train pipe into which air under pressure is admitted for making an application of the brakes, and a valve mechanism operated by said train pipe pressure for controlling the supply of air to a brake cylinder, of a maintaining chamber or reservoir, means for increasing the pressure in said chamber at a predetermined rate and a valve device governed by the pressure of said maintaining chamber for supplying air to said train pipe to maintain the pressure therein.

3. In a fluid pressure brake, the combination with a train pipe normally at atmospheric pressure, means for admitting air under pressure to said train pipe to apply brakes, and a valve mechanism subject to said train pipe pressure for controlling the supply of air under pressure to a brake cylinder, of an automatic valve device subject on opposite sides to fluid pressure for maintaining the train pipe pressure against leakage when the brakes are held applied and means for increasing the fluid pressure on said valve device at a predetermined rate.

4. In a fluid pressure brake, the combination with a train pipe line into which air under pressure is admitted when applying brakes, and a valve mechanism operated by pressure in said train pipe for controlling the supply of air to a brake cylinder, of a maintaining chamber or reservoir, means for increasing the pressure in said chamber at a predetermined rate, and a valve device governed by the opposing pressures of said chamber and the train pipe for supplying air to the train pipe.

5. In a fluid pressure brake, the combination with a train pipe into which air under pressure is admitted to apply brakes, and a valve mechanism subject to said train pipe pressure for controlling the supply of air under pressure to a brake cylinder, of a maintaining chamber adapted to contain the desired degree of pressure, means for increasing the pressure in said chamber at a predetermined rate, a movable abutment subject to the opposing pressures of the train pipe and said chamber, and a valve means operated by said abutment for controlling the supply of air to the train pipe.

6. In a fluid pressure brake, the combination with a train pipe into which air under pressure is admitted in applying brakes, a valve mechanism subject to said train pipe pressure for controlling the supply of air to a brake cylinder, and a maintaining and control chamber with means for increasing the pressure therein at a predetermined rate, a valve device operated by the pressure in said chamber for controlling the supply of air to said train pipe.

7. In a fluid pressure brake, the combination with a train pipe into which air under pressure is admitted in applying brakes, a valve mechanism subject to said train pipe pressure for controlling the supply of air to a brake cylinder, and a maintaining and control chamber with means for increasing the pressure therein at a predetermined rate, of a valve device operated by the opposing pressures of said chamber and the train pipe for controlling the supply of air to said train pipe.

8. In a fluid pressure brake, the combination with a train pipe normally at atmospheric pressure and a valve mechanism operated by the pressure in said train pipe for controlling the supply of air to a brake cylinder, of a control chamber, a brake valve having means for admitting fluid under pressure to said chamber at a predetermined rate, and a valve device operated by the pressure in said chamber for controlling the supply of air to said train pipe.

9. In a fluid pressure brake, the combination with a train pipe normally at atmospheric pressure and a valve mechanism operated by the pressure in said train pipe for controlling the supply of air to a brake cylinder, of a control chamber, a brake valve for controlling the supply of fluid under pressure to and its release from said chamber at a predetermined rate, and a valve device subject to the pressure in said chamber for controlling the supply of air to and its release from said train pipe.

10. In a fluid pressure brake, the combination with a train pipe normally at atmospheric pressure and a valve mechanism operated by the pressure in said train pipe for controlling the supply of air to a brake cylinder, of a control chamber, a brake valve for controlling the admission of fluid under pressure to said chamber at a predetermined rate, and a valve device operated by the opposing pressures of the train pipe and said chamber for controlling the supply of air to said train pipe.

11. In a fluid pressure brake, the combination with a train pipe normally carrying air at atmospheric pressure, a control chamber having a restricted inlet port or passage, and a brake valve for controlling said inlet passage, of a valve device operated by the pressure in said chamber for controlling the supply of air to said train pipe, and a valve mechanism operated by the train pipe pressure for controlling the supply of air to the brake cylinder.

12. In a fluid pressure brake, the combination with an independent train pipe line normally at atmospheric pressure, and an emergency train pipe line normally carrying air under pressure, of an application valve mechanism governed by the independent train pipe pressure for controlling the supply of air to a brake cylinder, and an emergency valve device operating upon a reduction in emergency train pipe pressure to supply air to the application valve mechanism, to close communication from the independent train pipe to said application valve mechanism, and to open a local vent from the emergency train pipe.

13. In a fluid pressure brake, the combination with a train pipe line into which air under pressure is admitted when applying brakes, and a valve mechanism operated by pressure in said train pipe for controlling the supply of air to a brake cylinder, of means for supplying fluid to said train pipe line to increase the pressure therein at a predetermined rate regardless of the length of the train.

In testimony whereof I have hereunto set my hand.

WALTER V. TURNER.

Witnesses:
 WM. M. CADY,
 A. M. CLEMENTS.